United States Patent
Li

(10) Patent No.: US 11,163,083 B2
(45) Date of Patent: Nov. 2, 2021

(54) ECHO DETECTION AND MEASUREMENT IN NOISY ENVIRONMENT FOR DOWNHOLE LOGGING

(71) Applicant: Halliburton Energy Services, Inc., Houston, TX (US)

(72) Inventor: Peng Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 289 days.

(21) Appl. No.: 16/587,170

(22) Filed: Sep. 30, 2019

(65) Prior Publication Data
US 2020/0124758 A1  Apr. 23, 2020

Related U.S. Application Data

(60) Provisional application No. 62/746,821, filed on Oct. 17, 2018.

(51) Int. Cl.
*G01V 1/50* (2006.01)
*G01V 1/37* (2006.01)
(Continued)

(52) U.S. Cl.
CPC .............. *G01V 1/50* (2013.01); *G01V 1/305* (2013.01); *G01V 1/306* (2013.01); *G01V 1/375* (2013.01);
(Continued)

(58) Field of Classification Search
CPC .......... G01V 1/50; G01V 1/306; G01V 1/375; G01V 1/523; G01V 1/305; G01V 2001/526; E21B 47/0025; E21B 47/00
See application file for complete search history.

(56) References Cited

U.S. PATENT DOCUMENTS

| 4,928,269 A | 5/1990 | Kimball et al. |
| 6,308,137 B1 | 10/2001 | Underhill et al. |

(Continued)

FOREIGN PATENT DOCUMENTS

WO  WO-2020081233 A1 *  4/2020  ............. G01V 1/305

OTHER PUBLICATIONS

Schlumberger, USI UltraSonic Imager Tool, Aug. 2004.
(Continued)

*Primary Examiner* — Daniel Pihulic
(74) *Attorney, Agent, or Firm* — Benjamin Ford; C. Tumey Law Group PLLC

(57) ABSTRACT

A method for echo detection may comprise recording one or more reflected waveforms, segmenting the one or more reflected waveforms based at least in part on a firing pulse length, applying a shaped filter to each segment of the one or more reflected waveforms, decoupling the one or more reflected waveforms into a time-frequency energy map, extracting a firing frequency band time domain plot from the decoupled time-frequency map, identifying a maximum amplitude in the extracted firing frequency band of the one or more reflected waveforms as an excitation, and identifying a second maximum amplitude in the extracted firing frequency band of the one or more reflected waveforms as an echo. A system for echo detection may comprise a digital signal processor, a transmitter, a transducer, a receiver, an analog to digital converter configured to digitize the measurement, and an information handling system.

20 Claims, 11 Drawing Sheets

(51) Int. Cl.
*G01V 1/30* (2006.01)
*G01V 1/52* (2006.01)

(52) U.S. Cl.
CPC ........ *G01V 1/523* (2013.01); *G01V 2001/526* (2013.01)

(56) References Cited

U.S. PATENT DOCUMENTS

| | | |
|---|---|---|
| 2015/0156592 A1 | 6/2015 | Bordon et al. |
| 2016/0054461 A1 | 2/2016 | Blankinship et al. |
| 2017/0115423 A1 | 7/2017 | Hori et al. |
| 2017/0315199 A1 | 11/2017 | Heaton |
| 2020/0124758 A1* | 4/2020 | Li .......................... G01V 1/305 |

OTHER PUBLICATIONS

Halliburton, Wireline & Perforating, CAST, H010381, Jul. 2013.
Sperry, XBAT-XCAL, XBAT™ Plus Azimuthal Sonic and Ultrasonic LWD Service, H013097, May 2019.
International Search Report and Written Opinion for Application No. PCT/US2019/054213, dated Jan. 17, 2020.

\* cited by examiner

ECHO DETECTION AND MEASUREMENT IN NOISY ENVIRONMENT FOR DOWNHOLE LOGGING

BACKGROUND

Boreholes drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. Currently, many downhole logging tools are based on the principle of generating and exerting a firing/probing signal (ultrasonic/sonic/EM/RF, etc.) signal into the borehole wall, detecting a borehole modulated echo or response signal, and comparing the difference between the firing signal and the echo signal in order to infer borehole petrophysical info. For example, Piezo-based ultrasonic downhole measurement typically operates in a pitch-catch mode where a source pulse wave is generated by applying voltage on a Piezo transducer. The generated pulse wave travels through borehole fluids and part of the wave reflects from a borehole wall. The reflected waveforms (also called echo) are captured and recorded by the same or a different transducer. By analyzing the travel time of the pulse wave from transmitting to the echo being received, a borehole radius may be derived given the fluid sound speed. By analyzing the amplitude of the echo signal, the acoustic impedance may be derived. By continuously transmitting (firing) and receiving the pulse signal (echo) while rotating the transducer, downhole azimuthal ultrasonic radius and impedance imaging may be achieved.

During the operations, the recorded echo signal may be very hard to extract, this is especially true for downhole ultrasonic measurement in oil-based mud environment (OBM). The echo/response signal may be surrounded by noises (high voltage firing circuitry, high frequency switching noises from other part of the logging instrument, or motor and other EM noises from other logging tools on the same tool string, etc.). Additionally, downhole environments affect the echo/receive signal detection and measurement. For example, an ultrasonic signal may be heavily attenuated by the mud; typically, the heavier the mud, the greater the attenuation. The attenuation rate may be up to 30~40 dB/inch for heavy mud cases. Some downhole tools may utilize high voltage firing to deliver greater power into the borehole in order to boost responses. However, high voltage firing circuitries may also increase the system noise floors and make the echo signal harder to find. All of this makes finding and picking the right echoes from the received measurement very hard to achieve.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to a system and method of a bottom hole assembly measurement system configured for a robust and effective echo detection and measurement for downhole logging. Without limitation, such techniques may be utilized in ultrasonic imaging and sonic/EM/RF type of logging tools where a firing induced response signal need to be extracted form a noisy measurement.

Figure 1:
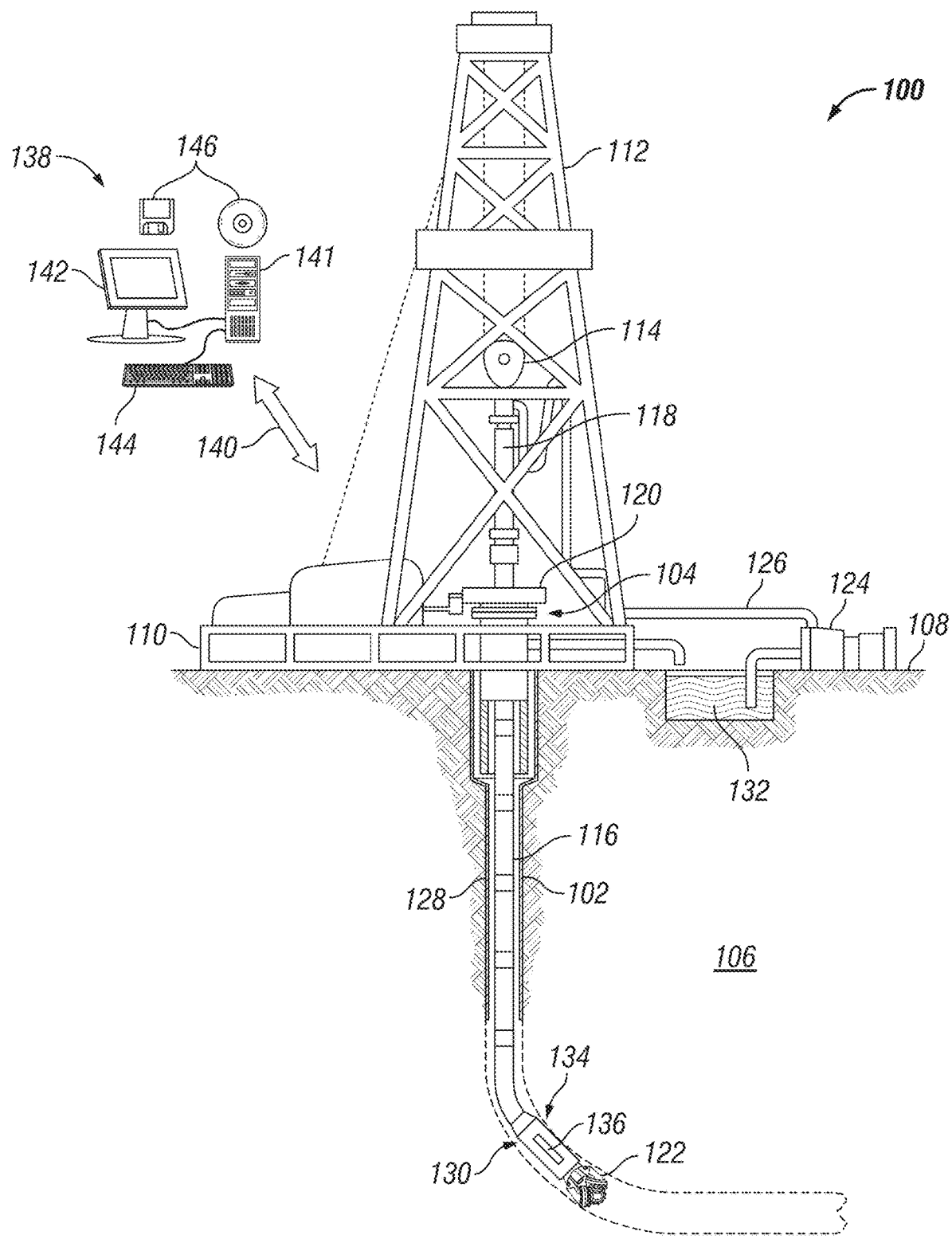
FIG. 1 illustrates an example of a drilling system.

FIG. 1 illustrates an example of drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extending generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may comprise any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may comprise at least one transducer 136, which may be disposed at or near the surface of measurement assembly 134. It should be noted that transducer 136 may also be referred to as a "pinger." Without limitation, transducer 136 may also be disposed within measurement assembly 134 and there may be four transducers 136 that may be disposed ninety degrees from each other. However, it should be noted that there may be any number of transducers 136 disposed along bottom hole assembly 130 at any degree from each other. Transducers 136 may function and operate to generate an acoustic pressure pulse that travels through borehole fluids. In examples, transducers 136 may further sense and acquire the reflected pressure wave which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived. Without limitation, transducers 136 may be made of piezo-ceramic crystals, or optionally magnetostrictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into, one, two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106. Optionally, these measurements may be used to plan well completion operations, including but not limited to placement of packers, hydraulic fracturing, cementing, acidizing or the placement of mud-loss mitigation treatments. Optionally, these measurements may be used for reservoir or over-burden characterization purposes.

Figure 2:
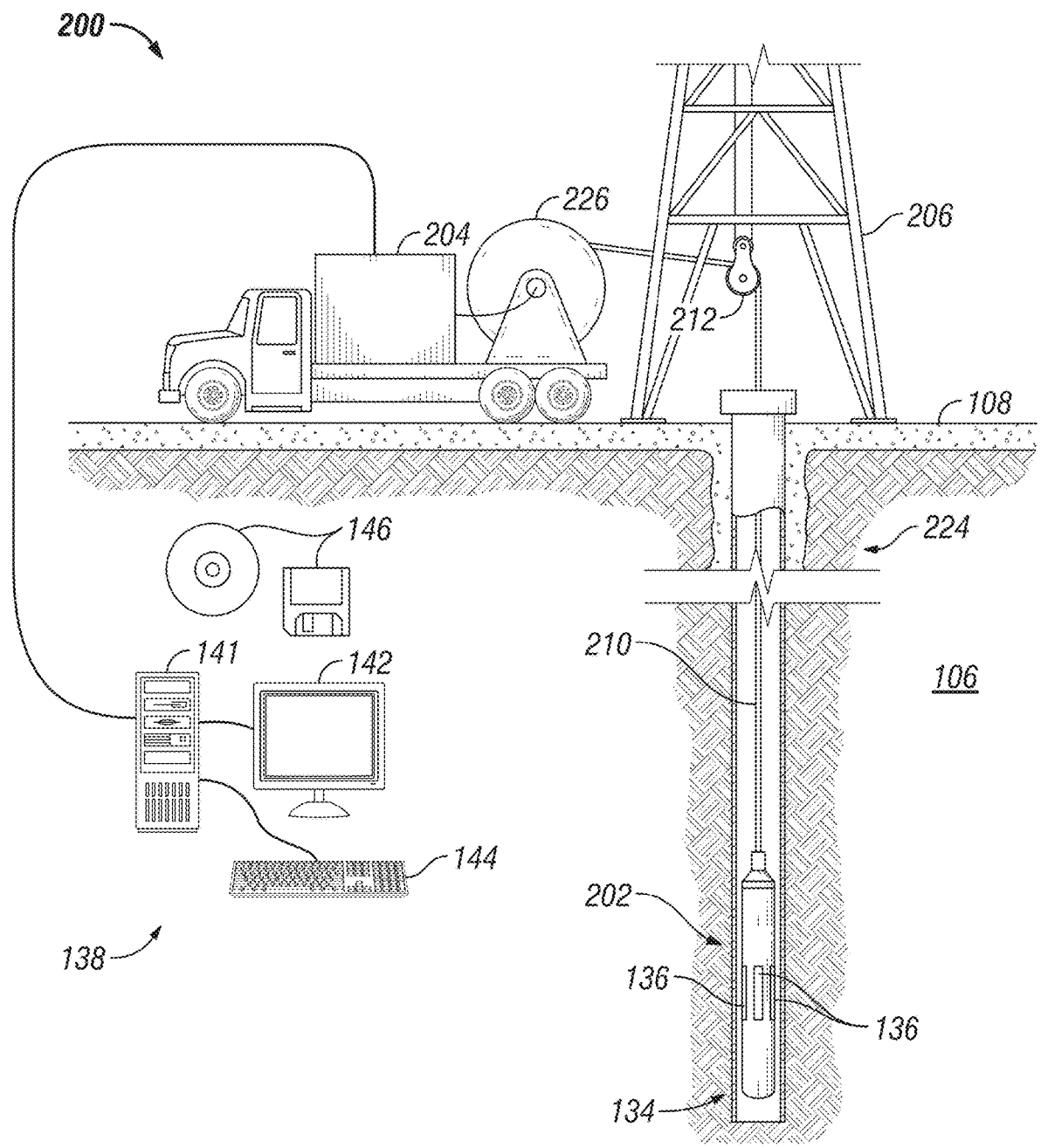
FIG. 2 illustrates an example of a well measurement system.

FIG. 2 illustrates a cross-sectional view of an example of well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produce in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 138 may comprise a safety valve (not illustrated) which controls the hydraulic pressure that drives drum 226 on vehicle 204 which may reels up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may include any number of transducers 136, which may be disposed at or near the surface of measurement assembly 134. Without limitation, there may be four transducers 136 that may be disposed ninety degrees from each other. However, it should be noted that there may be any number of transducers 136 disposed along bottom hole assembly 130 at any degree from each other.

Figure 3:
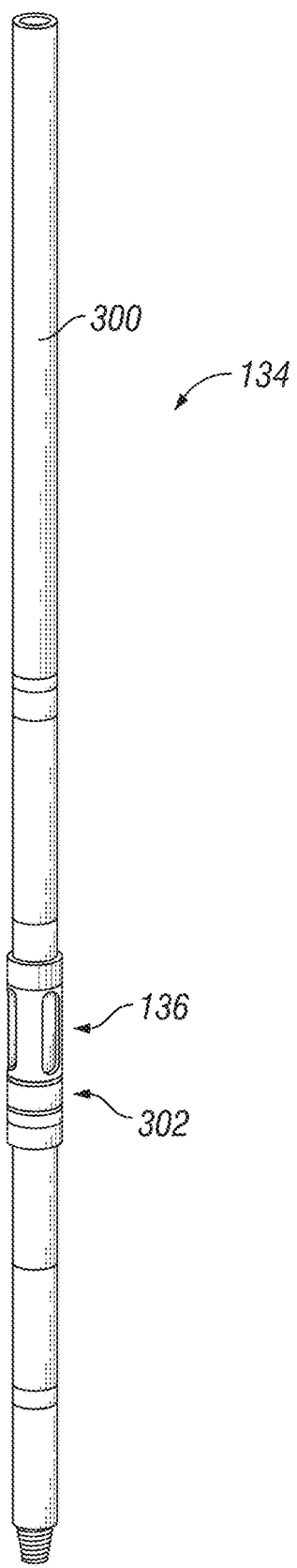
FIG. 3 illustrates an example of a measurement assembly.

FIG. 3 illustrates a close up view of an example of measurement assembly 134. As illustrated, measurement assembly 134 may include at least one battery section 300 and at least one instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may house at least one transducer 136. Transducers 136 may function and operate to generate and record excitations within a borehole. For example, during operations, transducer 136 may transmit an excitation into wellbore 102 (e.g., referring to FIG. 1). Without limitation, the excitation may be in the form of a pressure pulse, current, electromagnetic field, radio frequency, and/or any other suitable medium. This may allow for transducer 136 to be an ultrasonic device, acoustic device, electromagnetic device, radio frequency device, and/or the like. In examples, may be made of piezo-ceramic crystals, or optionally magnetostrictive materials or other materials that generate an acoustic pulse when activated electrically or otherwise. In one or more examples, transducers 136 may also include backing materials and matching layers. Additionally, transducer 136 may include coils, antennas, and/or the like. It should be noted that transducers 136 and/or instrument section 302 may be removable and replaceable, for example, in the event of damage or failure.

During operations, in examples where transducer 136 may emit a pressure wave, specifically an ultrasonic pressure pulse wave, the pressure pulse may have a frequency range from about 50 kHz to about 500 kHz. For example, the frequency range may have a center around 250 KHz. It should be noted that the pulse signal may be emitted with different frequency content. Recordings and/or measurements taken by transducer 136 may be transmitted to information handling system 138 by any suitable means, as discussed above. Transmission may be performed in real-time (transmitted to the surface via mud-pulse, wired-pipe or other telemetry) or post-drill (from data stored in the tool memory and recovered at the surface during tripping).

In examples, transducers 136 may further sense and record the transmission of the excitation. The excitation may travel from transducer 136 and reflect of a borehole wall. The reflected excitation is defined as an echo, which is recorded by transducer 136. Without limitation, transducers 136 may measure the excitation as it travels from transducer 136 and is reflected back to transducer 136 as an echo.

Measurements may be used to form images of the surrounding borehole and/or subterranean formation. To generate these images, measurement assembly 134 may utilize one or more transducers 136 positioned at varying azimuths around the circumference of measurement assembly 134. In examples, each transducer 136 may operate and function independently emitting an excitation and detecting its reflection from the borehole wall as a reflected echo.

Figure 4:
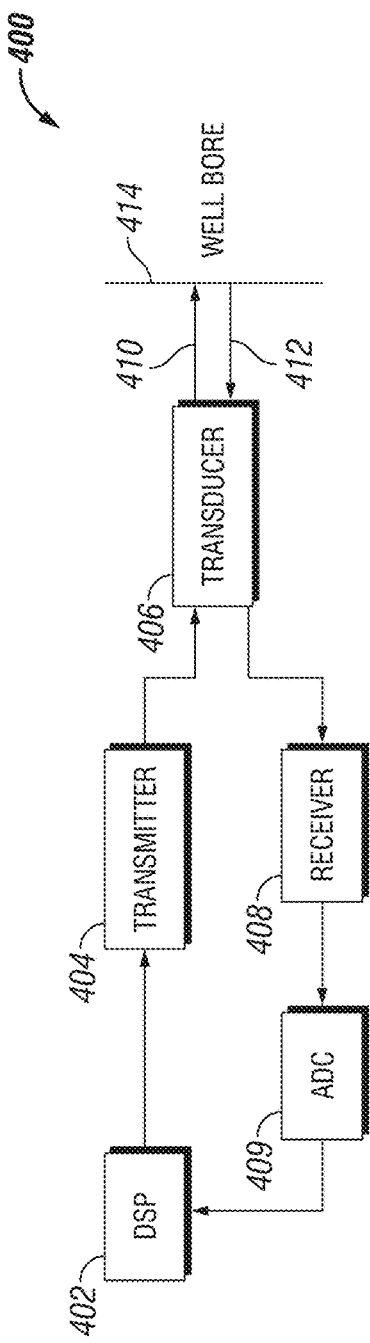
FIG. 4 illustrates an example of a structural diagram for the measurement assembly.

FIG. 4 shows an example of component diagram 400 for measurement assembly 134 (e.g., referring to FIG. 3). As illustrated in component diagram 400, measurement assembly 134 may comprise a digital signal processor 402, a transmitter 404, a transducer 406, a receiver 480, and an analog to digital converter (ADC) 409. As illustrated, digital signal processor 402 (DSP) may function and operate as the control and processing unit. It should be noted that DSP 402 may be disposed in an information handling system 138 (e.g., referring to FIG. 1) either on the surface, on downhole tool 202 (e.g., referring to FIG. 2), or both. DSP 402 may command transmitter 404 to generate a firing/probing signal for measurement operations. In examples, the firing/probing signal may be a "high voltage signal." The high voltage signal is defined as 100 volts or greater. Transducer 406 may convert the firing/probing signal into an excitation 410 (pressure pulse, current, EM, etc.) into wellbore 102 (e.g., referring to FIG. 1). In one or more examples, transducer 406 may also operate and function to sense the firing induced and borehole modulated reflected waveforms 412 or receive signal as the reflected waveforms 412 is reflected off borehole wall 414. A receiver 108 may act as an interface between transducer 406 and ADC 409. For example, reflected waveform 412 may be sensed by transducer 406 and receiver 408 may measure, record, and/or amplify reflected waveform 412. Without limitation, the measurements of reflected waveform 412 may transfer to ADS 409 as a signal. In one or more examples, ADC 409 may convert the signal of the recorded reflected waveforms 412 into digital format. This digital format may be transferred to DSP 402 for further measurements, storage, processing, and/or the like. Based at least in part on this digital signal, DSP 402 may alter and/or change how DSP 402 commands the generation of a firing/probing signal at transmitter 404.

Figure 5:
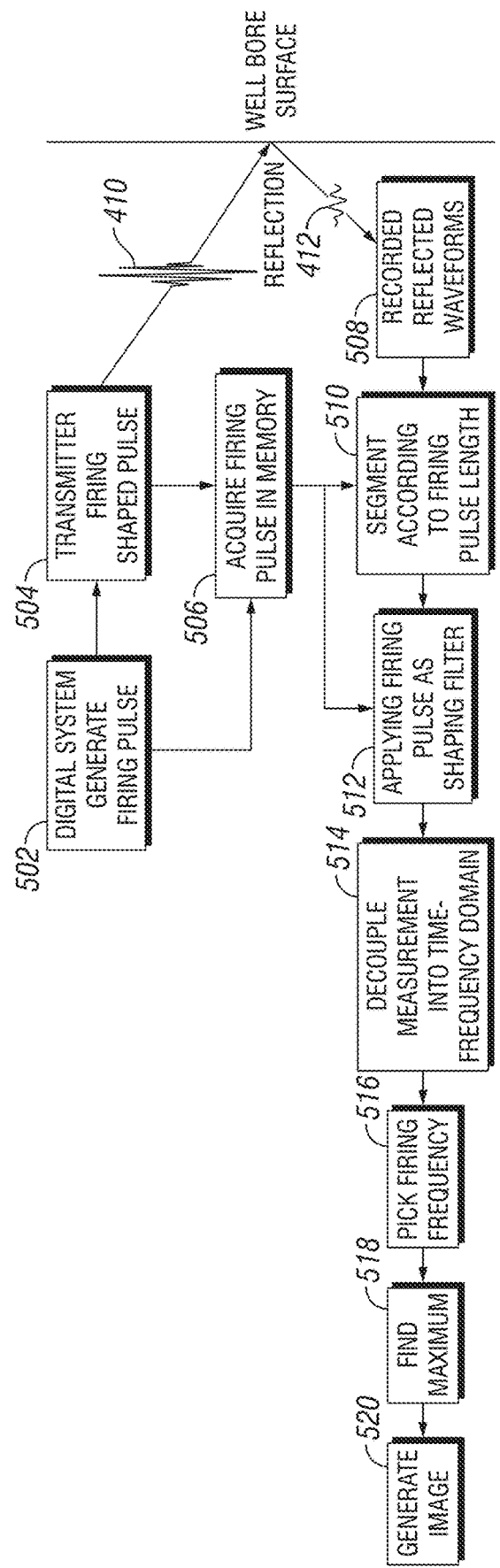
FIG. 5 illustrates an example of a workflow for generating an ultrasonic image.

FIG. 5 illustrates an example of workflow 500 for identifying an echo from recorded reflected waveforms 412. It should be noted that the method described below may also work with sonic/EM/RF type of logging tools. Workflow 500 begins with step 502. In step 502, DSP 402 (e.g., referring to FIG. 4) may send a command to transmitter 404 (e.g., referring to FIG. 4) to generate an excitation 410 (e.g., referring to FIG. 4) into the wellbore. In step 504, transmitter 404 may fire a shape excitation 410 (i.e., waveform) into the wellbore. Additionally, in step 506 DSP 402 may simultaneously control receiver 408 (e.g., referring to FIG. 4) and ADC 409 (e.g., referring to FIG. 4) to acquire and store in a memory device the transmitter generated excitation 410 as a baseline for future echo extractions. In step 508, reflected waveforms 412 arrives at transducer 406, DSP 402 may record reflected waveforms 412 into memory for processing to detect and measure the difference between generated excitation 410 and reflected waveforms 412.

With continued reference to FIG. 5, during a measurement process, each sensed reflected waveform 412 in step 508 may be segmented in time domain according to the length of excitation 410 in step 510. For example, reflected wave form 412 is segmented with each segment matching the firing pulse length in time, then the firing pulse shaped filter is applied to each segment. In step 512, the shape of excitation 410 may be applied to each section of the segment as a shaped filter. In step 514, the segmented and transmitter pulse shape filtered signal may then be decomposed into both time and frequency domain to produce a 2-D time-frequency energy map. The shaped filtering and the time-frequency decomposition may separate the signal of reflected waveforms 412 from both excitation 410 and all other recorded noise. The arrival time of reflected waveforms 412 and amplitude of reflected waveforms 412 may be extracted for petrophysics analysis. In step 516, a firing frequency for the transmitter in step 504 may be selected. This firing frequency band may be picked out from the 2-D time-frequency energy map, and the echo signal resides in the same frequency band. With the picked out frequency band, a slice of the 2-D time-frequency energy map is chosen. This picked up slice forms a time based energy waveform. In step 518, a maximum amplitude may be extracted in the chosen frequency band. A maximum amplitude is based on the numerical absolute value of a set of measurements. This may be performed by sorting reflected waveforms 412 and finding the largest numerical amplitude for reflected waveform 412. The extraction may be performed by visual inspection. Specifically, the largest amplitude of the frequency band is the excitation 410 from step 504 and the second largest amplitude is an echo within reflected waveforms 412. Additionally, the value of the amplitude may be an indication of the petrophysical property of wellbore 102 (e.g., referring to FIG. 1) and used for petrophysics analysis. As the firing time is known to the DSP, the firing signal and the echo signal may be easily separated in time. The identified echo may be used to generate an image of the borehole wall in step 520. For example, determining the echo arrival time and maximum amplitude may allow for the borehole acoustic imaging to form an image of the borehole wall. To produce an ultrasonic image during measurement operations, measurement assembly 134 (e.g., referring to FIG. 3) may continuously transmitting (firing) and receiving waveform 416 and the signal of reflected waveforms 412 while rotating transceivers 406, which may be processed to produce a downhole azimuthal ultrasonic image. In examples, by multiplying the borehole fluid sound speed the arrival times of reflected waveforms 412 may be converted into borehole radius, which may be utilized to from a borehole radius image. The amplitude of reflected waveforms 412 may be related with the acoustic impedance of the borehole and may form a borehole impedance image.

Figure 6:
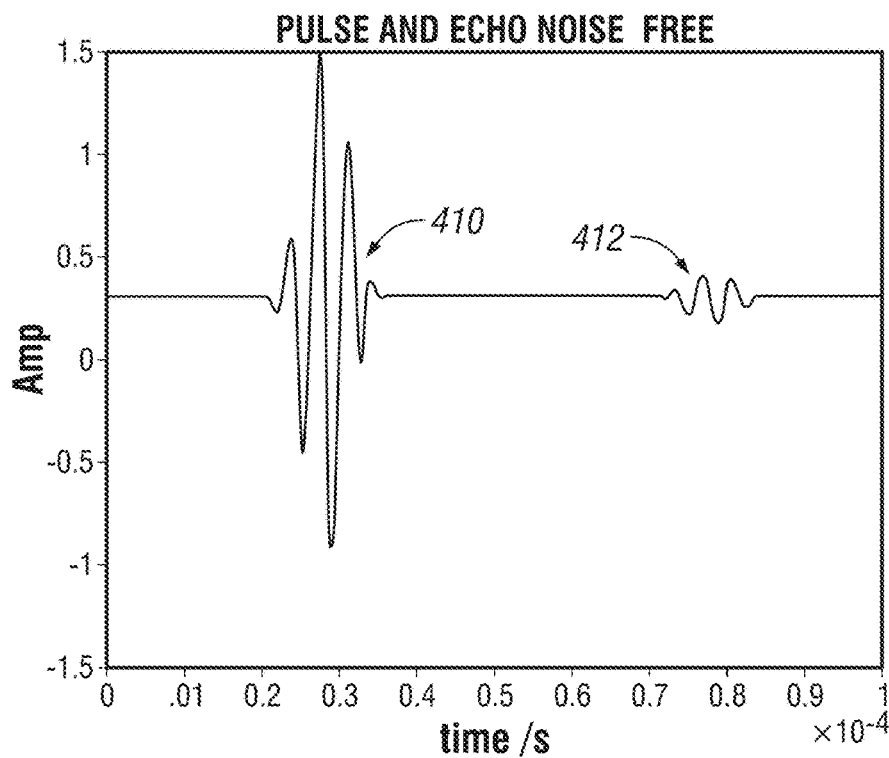
FIG. 6 is a graph of a firing waveform and an echo in accordance with example embodiments.
Figure 7:
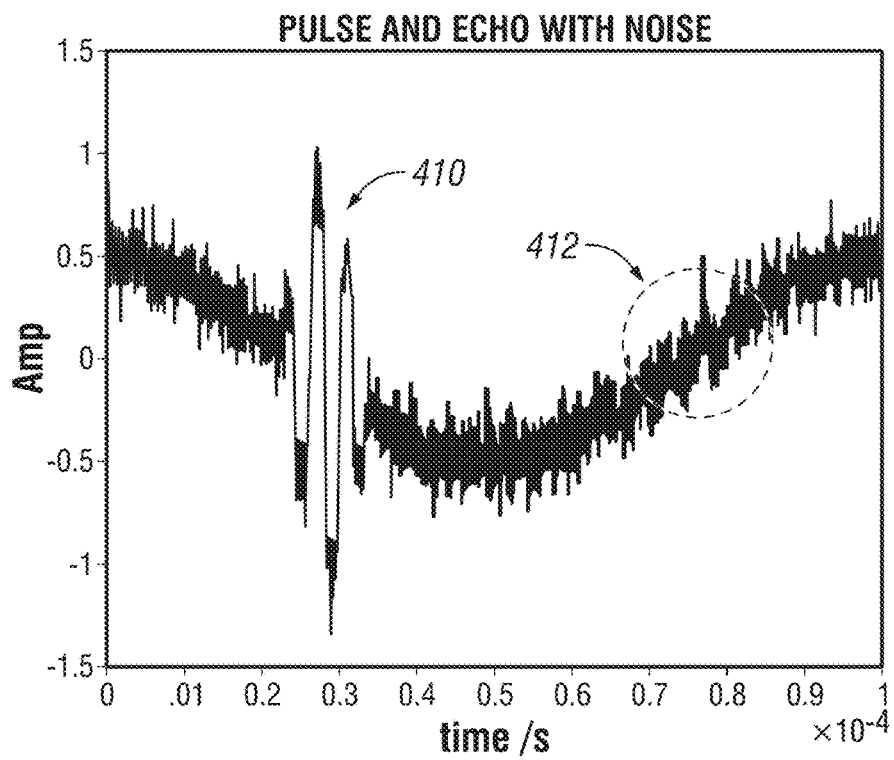
FIG. 7 is a graph of the firing waveform and the echo in recorded noise in accordance with example embodiments.

FIGS. 6 and 7 are graphs that show the effectiveness of this system in a low signal to noise (SNR) environment using simulated data in accordance with example embodiments. FIG. 6 is a graph of a firing pulse excitation 410 and a signal of reflected waveforms 412 in a noise free environment, where the firing/echo ration is 10:1. FIG. 7 shows firing pulse excitation 410 and reflected waveforms 412 with additional noise recordings. Common types of ultrasonic noises are low frequency noises from firing circuitry and also white noise from other part of bottom hole assembly 130 (e.g., referring to FIG. 1). The types of noise recorded may make it difficult to identify reflected waveforms 412 and its amplitude from noise.

Figure 8:
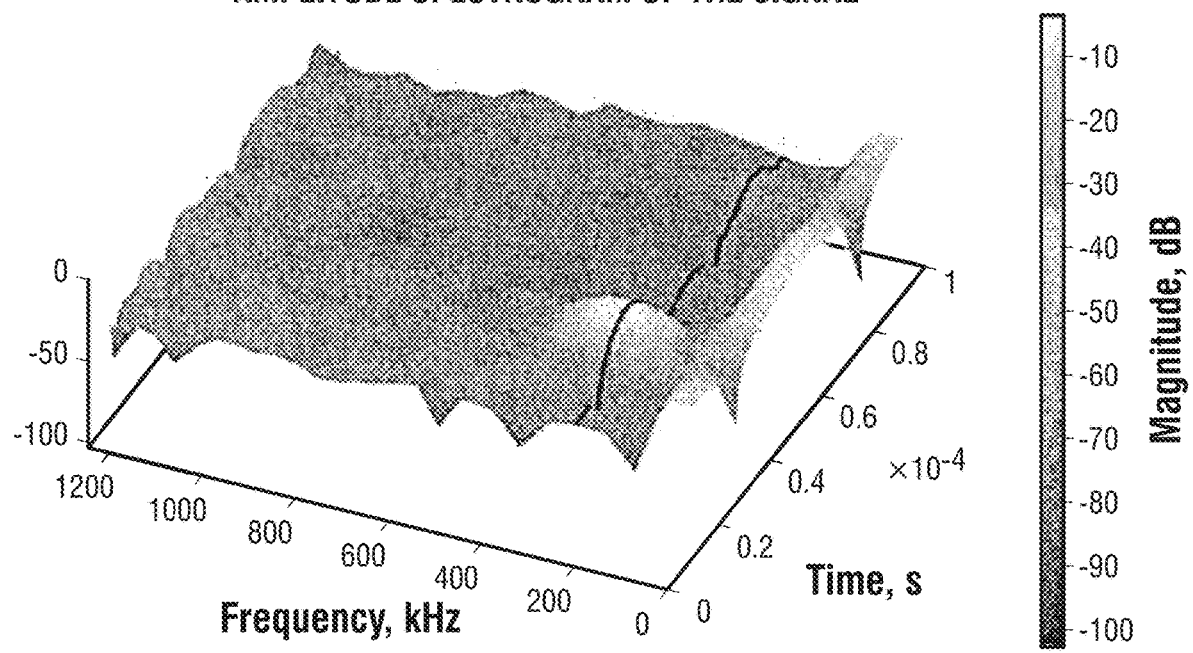
FIG. 8 is a graph of the firing waveform and the echo after a firing pulse shaped filter and a time-frequency domain decomposition in accordance with example embodiments.
Figure 9:
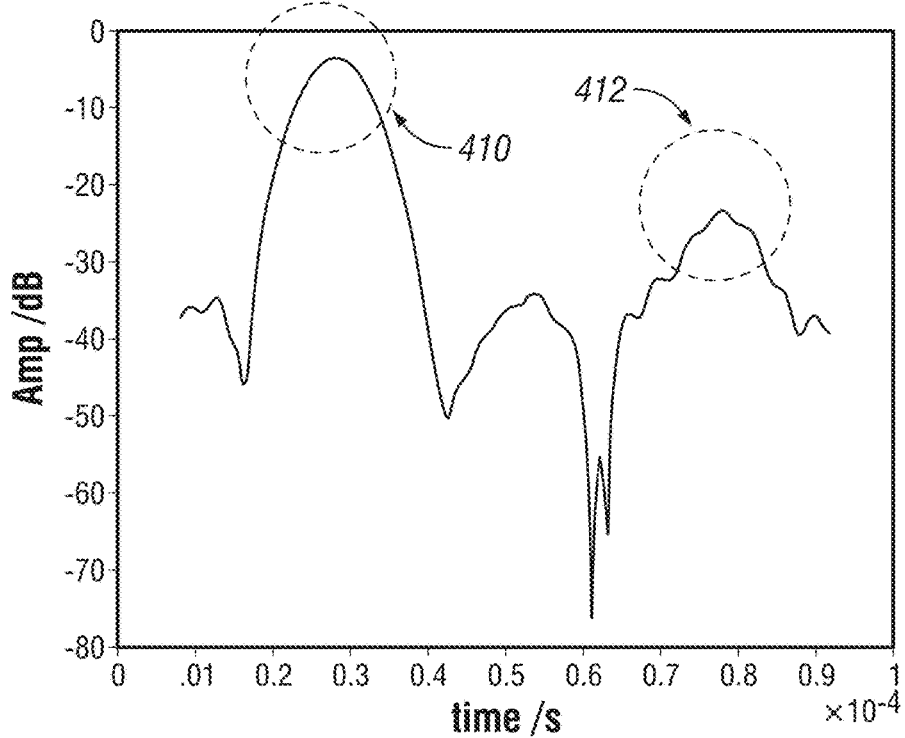
FIG. 9 is a graph of the firing waveform, the echo, and the recorded noise after the firing pulse shaped filter and the time-frequency domain decomposition in accordance with example embodiments.

FIGS. 8 and 9 are graphs that illustrate results after workflow 500 (e.g., referring to FIG. 5) has been implemented, using simulated data, in accordance with example embodiments. For example, FIG. 8 shows the result in both time and frequency domain after firing signal-based segment, shape filtering, and time-frequency domain decomposition. Furthermore, FIG. 8 shows low frequency noise is separated from firing excitation 410 and the signal of reflected waveforms 412. Additionally, white noise is spread out across all the time-frequency grid, which may allow for easy identification of firing excitation 410 and the signal of reflected waveforms 412. In FIG. 9, a graph illustrates extracting the firing frequency band, the firing excitation 410 and signal of reflected waveforms 412 may be identified from noise. The two peaks represent the shape of firing excitation 410 and signal of reflected waveforms 412. It may be seen that the peak of these 2 shapes corresponding to the same time domain peak of firing excitation 410 (at 27 microseconds) and signal of reflected waveforms 412 (peak at 77 microseconds) before recorded noise has being injected. FIG. 9 also shows that the ratio between firing excitation 410 and signal of reflected waveforms 412 is 20 dB, which is the 10:1 ration before noise injection. Thus, both the travel time of echo travel 412 and amplitude of reflected waveforms 412 may be accurately extracted with respect to firing excitation 410.

Figure 10:
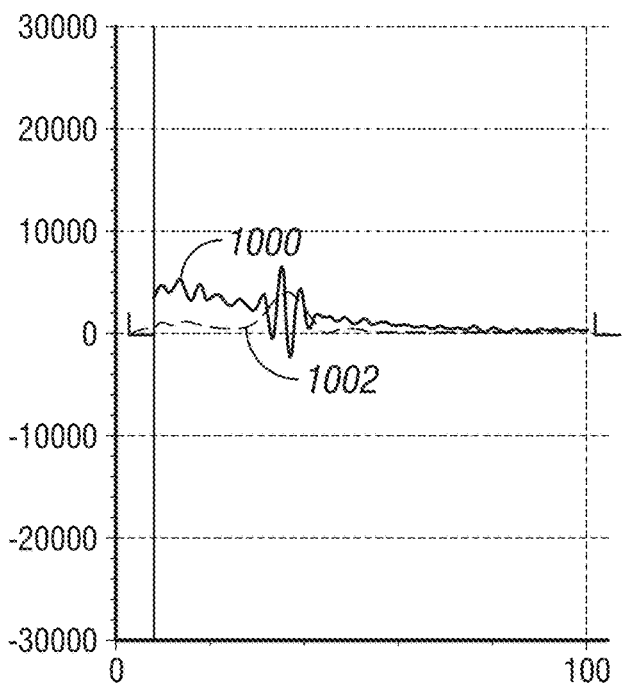
FIG. 10 is a graph of a random spike noise and the firing waveform in accordance with example embodiments.
Figure 11:
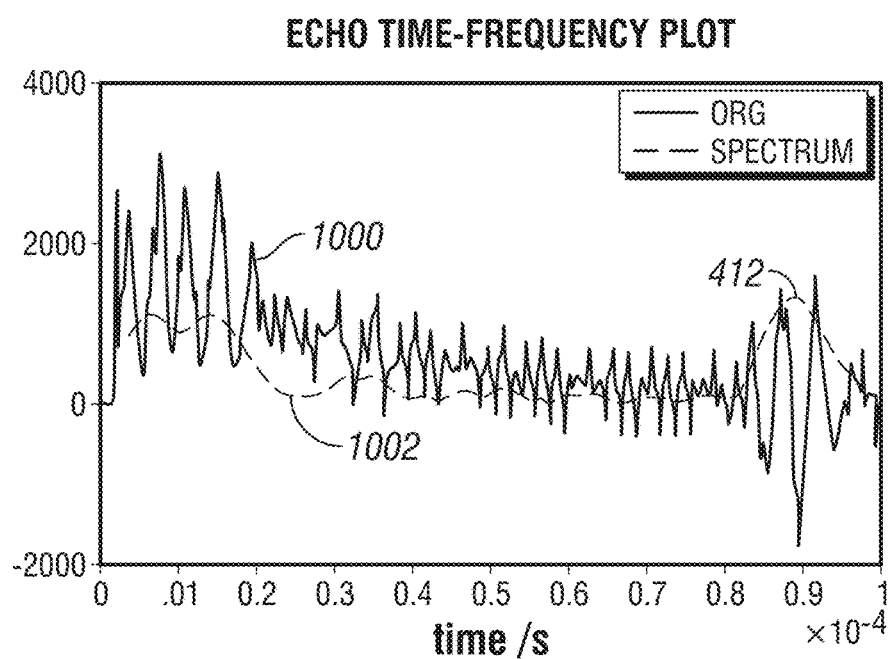
FIG. 11 is a graph of a transducer ringing with a different shape and random system noise with different frequency content in accordance with example embodiments.

FIG. 10 and FIG. 11 are graphs that further illustrate effective detection results from FIGS. 8 and 9, using simulated data, in accordance with example embodiments. In FIG. 10 the graph illustrates a signal 1000 that includes the signal from an reflected waveforms 412 (e.g., referring to FIG. 7), noise from firing excitation 410 (e.g., referring to FIG. 7) and ringing from transducer 406 (e.g., referring to FIG. 4). Frequency band 1002 is a chosen frequency band time domain result from step 516 (e.g., referring to FIG. 5). In one or more examples, both types of noise are not affecting accurate echo measurement. FIG. 11 is a graph of signal 1000 including random noises from a motor in bottom hole assembly 130 (e.g., referring to FIG. 1) and also ringing from transducer 406 at the beginning of a measurement operation. Workflow 500 accurately peaks out the signal of echo 412 (shown at 90 microseconds) since only the signal of reflected waveforms 412 has both the right frequency content and also the matching shape as the firing signal.

As discussed below, workflow 500 is an improvement over current technology that seeks to identify firing excitation 410 and the signal of reflected waveforms 412 through a variety of different methods. For example, current technology may utilize time domain envelops, correlation based methods, deconvolution method, and the like.

Figure 12:
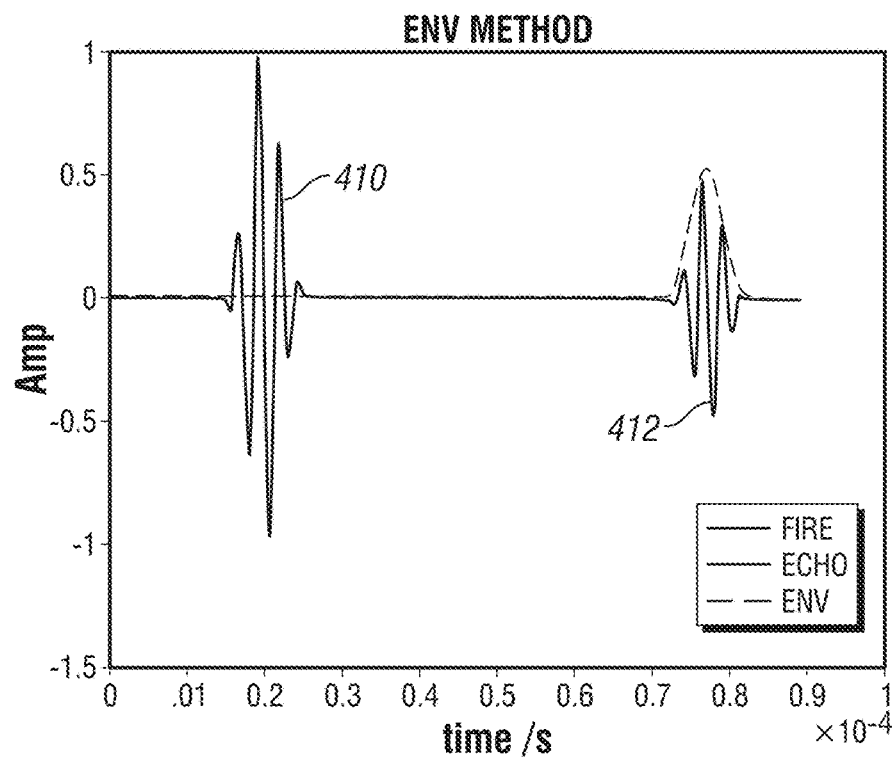
FIG. 12 is a graph illustrating the firing waveform and the echo within a constructed time-domain envelope for a filter in accordance with example embodiments.
Figure 13:
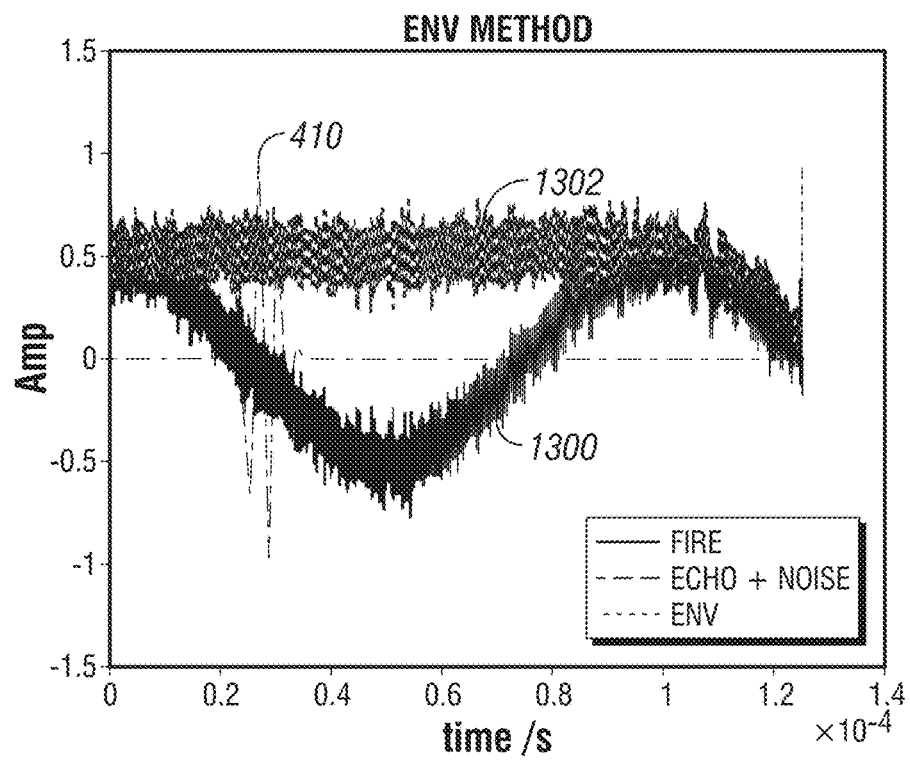
FIG. 13 is a graph illustrating the firing waveform, the echo, and the noise within a constructed time-domain envelope for the filter in accordance with example embodiments.

FIGS. 12 and 13 illustrates time domain envelops that may be utilized in existing technology, using simulated data, in accordance with example embodiments. For example, FIG. 12 is a graph for a time domain envelop that filters for a max amplitude pick, which may require minimum computational power on the downhole processor. As illustrated in FIG. 12, firing excitation 410 and the signal of reflected waveforms 412 may be identified by a time domain envelope. Although simple and low cost, it is sensitive to all type of noises, and may require filtering before searching for the amplitude maximum. For example, as illustrated in FIG. 13, noise 1300 may hide firing excitation 410 and the signal of reflected waveforms 412 (e.g., referring to FIG. 12) and time domain envelope 1302 may cut off the amplitude of firing excitation 410. Therefore, the use of filtering has many drawbacks. If not filtered enough, the effect of noise removal is usually limited. If the noise frequency content is close to the signal of reflected waveforms 412 (e.g., referring to FIG. 12), filtering may also change the signal of reflected waveforms 412. To be effective, higher order filters may be utilized. However, higher order filters may be computationally expensive and may also change both the phase and shape of the measurement signal, which may negatively impact both the travel time and amplitude results. Additionally, the signal of reflected waveforms 412 may be a bipolar wavelet signal, which may reduce precision in identifying the amplitude peak as the time domain amplitude max usually is not the true echo center position. The time domain envelop method is better than the direct max amplitude method in a way that it may locate the center of the signal of reflected waveforms 412. However, the time domain envelope is sensitive to noises. Other methods may be utilized in technology to identify firing excitation 410 and the signal of reflected waveforms 412.

Figure 14:
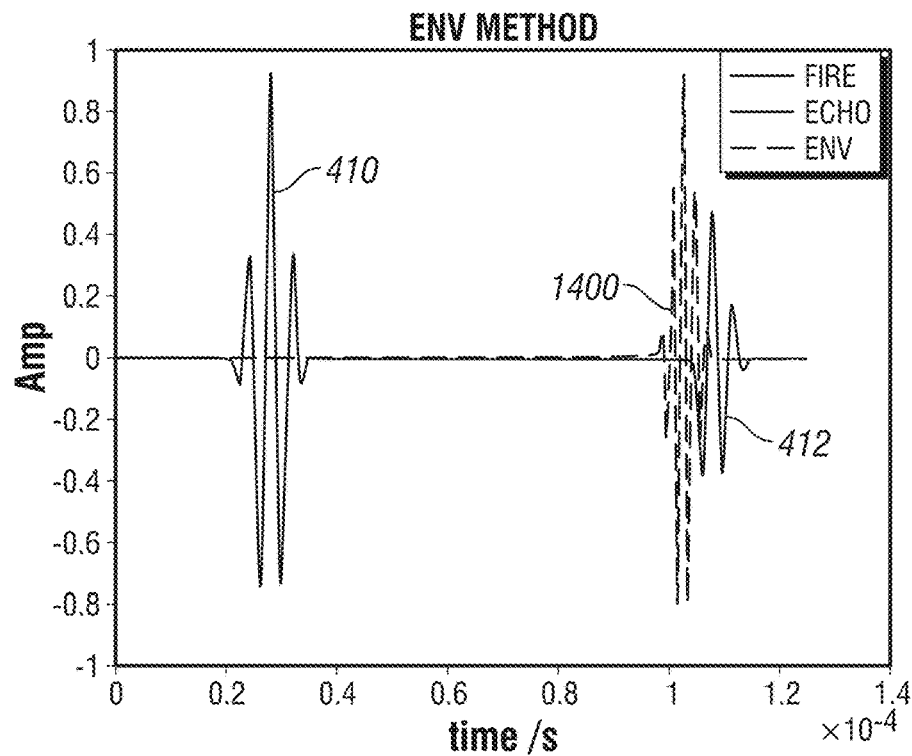
FIG. 14 is a graph illustrating the firing waveform and the echo within a constructed cross correlation envelope for a filter in accordance with example embodiments.
Figure 15:
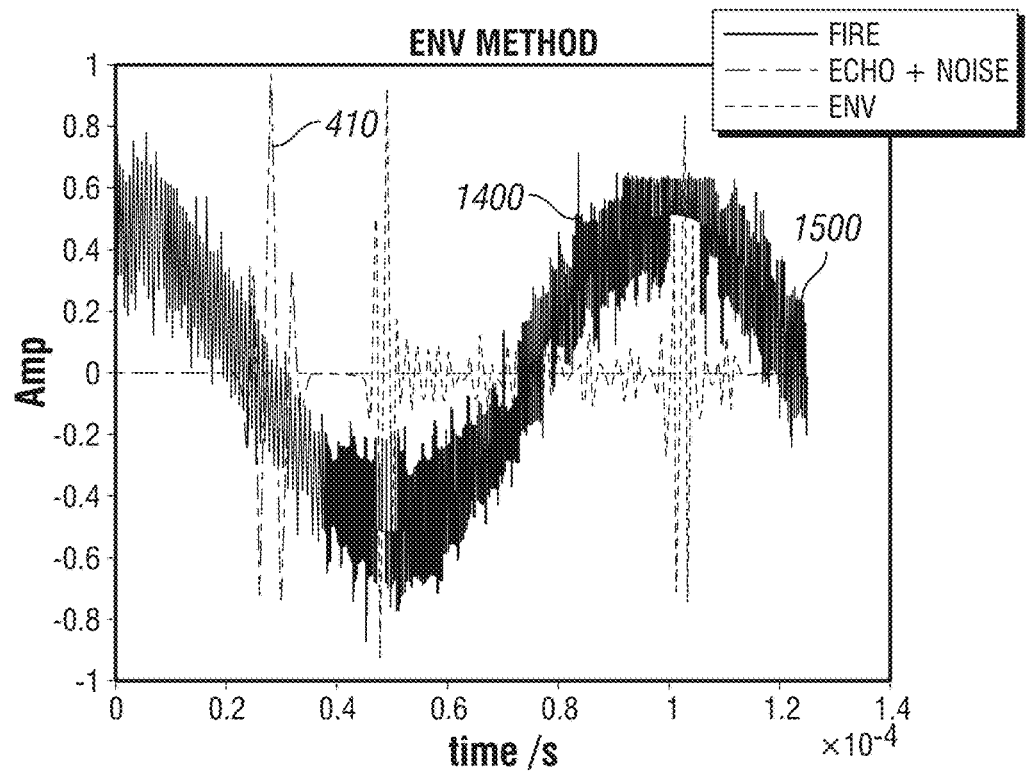
FIG. 15 is a graph illustrating the firing waveform, the echo, and the noise within a constructed cross correlation envelope for the filter in accordance with example embodiments.

FIG. 14 is an example of the firing waveform and the echo within a constructed cross correlation envelope for a filter and FIG. 15 is an example of the firing waveform, the echo, and the noise within a constructed cross correlation envelope for the filter in accordance with example embodiments. Both FIGS. 14 and 15 use simulated data. The correlation-based method may perform a cross-correlation operation between the measurement and a base wavelet signal (which may relate with the firing signal and/or the impulse response of the ultrasonic transducer). As illustrated in FIG. 14, firing excitation 410 and the signal of reflected waveforms 412 may be identifiable next to cross-correlation results 1400. However, the cross-correlation method may only be used to find the travel time first and then either time domain maximum or envelop method has to be applied again for the amplitude computation, which means the amplitude of reflected waveforms 412 is still subject to noise problems. As illustrated in FIG. 15, noise 1500 may hide firing excitation 410 and the signal of reflected waveforms 412 (e.g., referring to FIG. 14). The cross-correlation results 1400 fail to identify firing excitation 410 and the signal of reflected waveforms 412. Additionally, the cross-correlation method may have limited performances in cases with poor signal to noise ratio.

Figure 16:
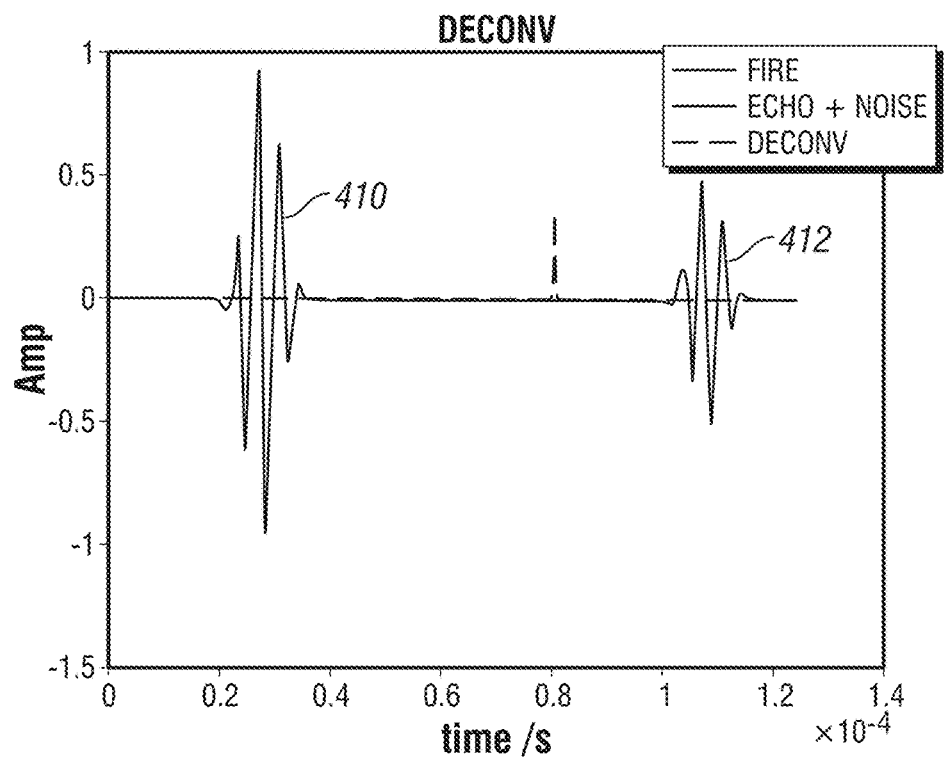
FIG. 16 is a graph illustrating the firing waveform and the echo within a constructed deconvolution envelope for a filter in accordance with example embodiments.
Figure 17:
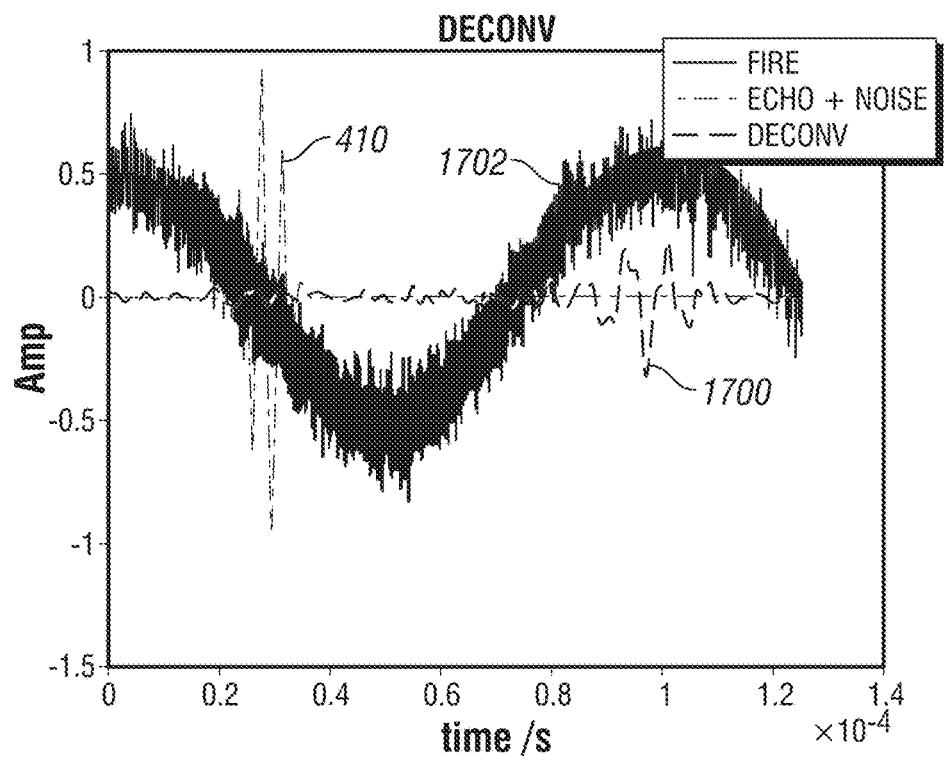
FIG. 17 is a graph illustrating the firing waveform, the echo, and the noise within a constructed deconvolution envelope for the filter in accordance with example embodiments.

Unlike the time domain envelop and cross-correlation results described above, the deconvolution method (workflow 500, e.g., referring to FIG. 5) treats firing excitation 410 as an input and the signal of reflected waveforms 412 as the output signal, as illustrated in FIG. 16. FIG. 16 illustrates simulated data. The deconvolution method may operate and function to compute a transfer functions of input to output and deconvolves back into a time domain to find both the echo travel time and amplitude at the same time. It has advantages that both travel time and echo amplitude may be found simultaneously. However, as illustrated in FIG. 17, which uses simulated data, deconvolution results 1700 may not converge when noise 1702 is presented, and the deconvolution method may require manual adjustment on the noise injections to fight over the convergence issues, which might makes less applicable for logging while drilling downhole operations.

Figure 18:
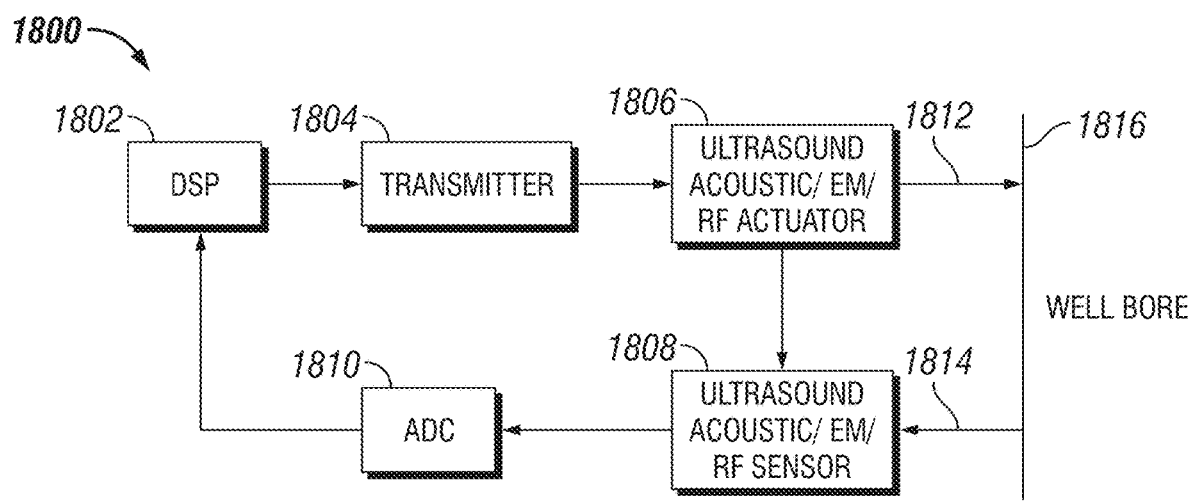
FIG. 18 is another example of a structural diagram for the measurement assembly.

FIG. 18 illustrates a component diagram 1800 for measurement assembly 134 (e.g., referring to FIG. 3). As illustrated in component diagram 1800, measurement assembly 134 may comprise a digital signal processor 1802, a transmitter 1804, actuator 1806, sensor 1808, and an analog to digital converter (ADC) 1810. As illustrated, digital signal processor 1802 (DSP) may function and operate as the control and processing unit. It should be noted that DSP 1/02 may be disposed in an information handling system 138 (e.g., referring to FIG. 1) either on the surface, on downhole tool 202 (e.g., referring to FIG. 2), or both. DSP 1802 may command transmitter 1804 to generate a firing/probing signal for measurement operations. Actuator 1806 may convert the firing/probing signal into an excitation 1812 (pressure, current, EM, etc.) into wellbore 102 (e.g., referring to FIG. 1). In one or more examples, actuator 1806 may operate and/or function as an ultrasonic, acoustic, electromagnetic, and/or radio frequency device. A sensor 1808 may record reflected waveforms 1814 and transmit the recording to ADC 1810. Echo 1814 may be the reflection of excitation 1812 off wellbore wall 1816. Sensor 1808 may operate and/or function to record reflected waveforms 1814 as an ultrasonic, acoustic, electromagnetic, and/or radio frequency device. In examples, ADC 1810 may convert the recorded reflected waveforms 1814 into digital format. Digitized reflected waveforms 1814 may be sent to DSP 1802 for processing, storage, and/or transmission to an off-site location. Based at least in part of on the reflected waveforms 1814, DSP 1802 may alter and/or change the commands to transmitter 1804 for generating a firing/probing signal.

It will be appreciated by those of ordinary skill in the art, exemplary examples of the system and individual devices of the present disclosure may be used in a variety of subterranean applications, including imaging. Exemplary examples of the system and devices may be introduced into a subterranean formation and utilized to image a borehole and the surrounding formation. While the preceding discussion is directed to the use of downhole imaging, those of ordinary skill in the art will also appreciate that it may be desirable to utilize other types of imaging in the marine field and medical field, in accordance with examples of the present disclosure.

While the disclosure above describes methods for used with oil field devices and/or systems, the methods above may be used with medical devices and/or systems as well as marine devices and/or systems. The methods are not limited to the device and systems described above.

The systems and methods for echo detection and measurement within any suitable tool may include any of the various features of the systems and methods disclosed herein, including one or more of the following statements.

Statement 1: A method for echo detection may comprise recording one or more reflected waveforms, segmenting the one or more reflected waveforms based at least in part on a firing pulse length, applying a shaped filter to each segment of the one or more reflected waveforms, decoupling the one or more reflected waveforms into a time-frequency energy map, extracting a firing frequency band time domain plot from the decoupled time-frequency map; identifying a maximum amplitude in the extracted firing frequency band of the one or more reflected waveforms as an excitation, and identifying a second maximum amplitude in the extracted firing frequency band of the one or more reflected waveforms as an echo.

Statement 2. The method of statement 1, further comprising creating an ultrasonic image based at least in part on the echo.

Statement 3. The method of statements 1 or 2, wherein the shaped filter is an waveform of an excitation.

Statement 4. The method of statements 1-3, wherein the maximum amplitude is a largest numerical absolute value of the extracted firing frequency band.

Statement 5. The method of statement 4, wherein the maximum amplitude is a petrophysical property of a wellbore.

Statement 6. The method of statements 1-4, further comprising disposing a downhole tool into a wellbore, wherein the downhole tool may comprise a digital signal processor, a transmitter, wherein the transmitter operates to transmit a firing waveform and is controlled by the digital signal processor, a transducer, wherein the transducer operates to emit an excitation based at least in part on the firing waveform and record the one or more reflected waveforms, a receiver, wherein the receiver is configured to measure the one or more reflected waveforms, and an analog to digital converter configured to digitize the measurement.

Statement 7. The method of statement 6, further comprising generating a firing pulse with the digital signal processor.

Statement 8. The method of statement 7, further comprising sending the firing pulse to the transducer.

Statement 9. The method of statement 8, further comprising transmitting an excitation based at least in part on the firing pulse from the transducer.

Statement 10. The method of statement 9, further comprising receiving the one or more reflected waveforms with the transducer.

Statement 11. A system may comprise a digital signal processor, a transmitter, wherein the transmitter operates to transmit a firing waveform and is controlled by the digital signal processor, a transducer, wherein the transducer operates to emit an excitation based at least in part on the firing waveform and record one or more reflected waveforms, a receiver, wherein the receiver is configured to measure the one or more reflected waveforms, an analog to digital converter configured to digitize the measurement, and an information handling system. The information handling system may be configured to segment the one or more reflected waveforms based at least in part on a firing pulse length, apply a shaped filter to the one or more reflected waveform, decouple the one or more reflected waveforms into a time-frequency domain, and extract a firing frequency band from the time-frequency energy map.

Statement 12. The system of statement 11, wherein the information handling system is further configured to identify a maximum amplitude in the one or more reflected waveform as an excitation.

Statement 13. The system of statement 12, wherein the maximum amplitude is a largest numerical absolute value of an extracted firing frequency band.

Statement 14. The system of statement 12, wherein the information handling system is further configured to identify a second maximum amplitude in the one or more reflected waveforms as an echo.

Statement 15. The system of statements 11 or 12, wherein the information handling system is further configured to create an ultrasonic image based at least in part on the echo.

Statement 16. The method of statements 11, 12, or 15, wherein the shaped filter is a waveform of an excitation.

Statement 17. The method of statement 16, wherein the information handling system is configured to acquire the waveform which is stored in a memory device.

Statement 18. The method of statement 17, wherein the information handling system is further configured to produce a 2-D time-frequency energy map.

Statement 19. The method of statements 11, 12, 14, 15, or 17, wherein the digital signal processor is configured to generate a firing pulse.

Statement 20. The method of statement 18, wherein the digital signal processor is configured to send the firing pulse to the transducer.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for echo detection comprising:
   recording one or more reflected waveforms;
   segmenting the one or more reflected waveforms based at least in part on a firing pulse length;
   applying a shaped filter to each segment of the one or more reflected waveforms;
   decoupling the one or more reflected waveforms into a time-frequency energy map;
   extracting a firing frequency band time domain plot from the decoupled time-frequency energy map;
   identifying a maximum amplitude in the extracted firing frequency band of the one or more reflected waveforms as an excitation; and
   identifying a second maximum amplitude in the extracted firing frequency band of the one or more reflected waveforms as an echo.

2. The method of claim 1, further comprising creating an ultrasonic image based at least in part on the echo.

3. The method of claim 1, wherein the shaped filter is a waveform of an excitation.

4. The method of claim 1, wherein the maximum amplitude is a largest numerical absolute value of the extracted firing frequency band.

5. The method of claim 4, wherein the maximum amplitude is a petrophysical property of a wellbore.

6. The method of claim 1, further comprising disposing a downhole tool into a wellbore, wherein the downhole tool comprises:
   a digital signal processor;
   a transmitter, wherein the transmitter operates to transmit a firing waveform and is controlled by the digital signal processor;
   a transducer, wherein the transducer operates to emit an excitation based at least in part on the firing waveform and record the one or more reflected waveforms;
   a receiver, wherein the receiver is configured to measure the one or more reflected waveforms; and
   an analog to digital converter configured to digitize the measurement.

7. The method of claim 6, further comprising generating a firing pulse with the digital signal processor.

8. The method of claim 7, further comprising sending the firing pulse to the transducer.

9. The method of claim 8, further comprising transmitting an excitation based at least in part on the firing pulse from the transducer.

10. The method of claim 9, further comprising receiving the one or more reflected waveforms with the transducer.

11. A system comprising:
    a digital signal processor;
    a transmitter, wherein the transmitter operates to transmit a firing waveform and is controlled by the digital signal processor;
    a transducer, wherein the transducer operates to emit an excitation based at least in part on the firing waveform and record one or more reflected waveforms;
    a receiver, wherein the receiver is configured to measure the one or more reflected waveforms;
    an analog to digital converter configured to digitize the measurement; and
    an information handling system configured to:
      segment the one or more reflected waveforms based at least in part on a firing pulse length;
      apply a shaped filter to the one or more reflected waveforms;
      decouple the one or more reflected waveforms into a time-frequency energy map; and
      extract a firing frequency band from the time-frequency energy map.

12. The system of claim 11, wherein the information handling system is further configured to identify a maximum amplitude in the one or more reflected waveforms as the excitation.

13. The system of claim 12, wherein the maximum amplitude is a largest numerical absolute value of an extracted firing frequency band.

14. The system of claim 12, wherein the information handling system is further configured to identify a second maximum amplitude in the one or more reflected waveforms as an echo.

15. The system of claim 14, wherein the information handling system is further configured to create an ultrasonic image based at least in part on the echo.

16. The system of claim 11, wherein the shaped filter is a waveform of the excitation.

17. The system of claim 16, wherein the information handling system is configured to acquire the waveform which is stored in a memory device.

18. The system of claim 11, wherein the information handling system is further configured to produce a 2-D time-frequency energy map.

19. The system of claim 11, wherein the digital signal processor is configured to generate a firing pulse.

20. The system of claim 19, wherein the digital signal processor is configured to send the firing pulse to the transducer.

* * * * *